United States Patent
Kowarz et al.

(10) Patent No.: US 6,717,714 B1
(45) Date of Patent: Apr. 6, 2004

(54) METHOD AND SYSTEM FOR GENERATING ENHANCED GRAY LEVELS IN AN ELECTROMECHANICAL GRATING DISPLAY

(75) Inventors: Marek W. Kowarz, Henrietta, NY (US); James G. Phalen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/320,294

(22) Filed: Dec. 16, 2002

(51) Int. Cl.[7] ............................ G02B 26/00; G02B 26/02
(52) U.S. Cl. ........................ 359/290; 359/291; 359/231
(58) Field of Search .................................. 359/223, 224, 359/230, 231, 246, 247, 290, 291, 295, 572, 573

(56) References Cited

U.S. PATENT DOCUMENTS

| | | | |
|---|---|---|---|
| 5,668,611 A | 9/1997 | Ernstoff et al. | 348/771 |
| 5,812,303 A | 9/1998 | Hewlett et al. | 359/298 |
| 5,903,323 A | 5/1999 | Ernstoff et al. | 348/771 |
| 6,038,057 A * | 3/2000 | Brazas et al. | 359/291 |
| 6,233,087 B1 * | 5/2001 | Hawkins et al. | 359/290 |
| 6,307,663 B1 | 10/2001 | Kowarz | 359/231 |
| 6,411,425 B1 | 6/2002 | Kowarz et al. | 359/291 |
| 6,476,848 B2 | 11/2002 | Kowarz et al. | 347/255 |

OTHER PUBLICATIONS

Marek W. Kowarz, et al., "Conformal Grating Electromechanical System (GEMS) For High-Speed Digital Light Modulation," IEEE 15th International MEMS Conference 2002, pp. 568–573.

* cited by examiner

Primary Examiner—Loha Ben
Assistant Examiner—William Choi
(74) Attorney, Agent, or Firm—Stephen H. Shaw (57) ABSTRACT

A method for actuating an electromechanical grating device that has ribbon elements. The method includes the steps of: providing a data stream, generating a pulse width modulated waveform including at least two different non-zero voltages from the data stream, and applying the pulse width modulated waveform to the ribbon elements such that the ribbon elements transition through at least three different states of actuation that correspond to the pulse width modulated waveform.

48 Claims, 12 Drawing Sheets

METHOD AND SYSTEM FOR GENERATING ENHANCED GRAY LEVELS IN AN ELECTROMECHANICAL GRATING DISPLAY

FIELD OF THE INVENTION

This invention relates to an image-forming system containing an array of electromechanical grating devices. More particularly, the invention relates to the formation of gray levels in a projection display system containing a linear array of electromechanical grating devices.

BACKGROUND OF THE INVENTION

Many projection display systems employ a spatial light modulator to convert electronic image information into an output image. At present in such display systems, the light source is typically a white light lamp and the spatial light modulator is typically an area array containing liquid crystal devices or micromirror devices. Alternative display system architectures with one or more laser sources and spatial light modulators that are linear arrays of electromechanical grating devices show much promise for the future. To display high quality motion images, the individual devices of these different spatial light modulators must be capable of rapidly producing a large number of gray levels in the image. The limit on the number of possible gray levels is usually dictated either by the device dynamics or by the speed of electronic components within the display system.

Prior inventions have disclosed schemes for increasing the number of gray levels in the image without increasing the speed of the modulating elements or of the associated electronics. These schemes vary the illumination that is incident on the spatial light modulator during a frame. Specifically, according to U.S. Pat. No. 5,812,303, issued to Hewlett et al. on Sep. 22, 1998, entitled, "LIGHT AMPLITUDE MODULATION WITH NEUTRAL DENSITY FILTERS," additional gray levels can be obtained with a micromirror device by using a variable neutral density filter to generate bright and dark gray levels. The dark gray scale is obtained by attenuating the illumination for some time during the display of a frame. The bright gray scale has no attenuation. In practice, the invention is implemented by rotating a filter wheel with a multi-segment neutral density filter in synchronization with the data stream.

An alternative approach employs a pulsating light source, such as a pulsed laser to reduce speed requirements on the electronic components, as described in U.S. Pat. No. 5,668,611, issued to Ernstoff et al. on Sep. 16, 1997, entitled "FULL COLOR SEQUENTIAL IMAGE PROJECTION SYSTEM INCORPORATING PULSE RATE MODULATED ILLUMINATION." The illumination on the spatial light modulator is adjusted by varying the pulse rate or pulse count. Moreover, the average brightness of the light source is determined by the number of pulses. A complementary method uses direct intensity modulation of the light source to obtain multiple levels of brightness, as disclosed in U.S. Pat. No. 5,903,323, issued to Ernstoff al. on May 11, 1999, entitled "FULL COLOR SEQUENTIAL IMAGE PROJECTION SYSTEM INCORPORATING TIME MODULATED ILLUMINATION." Both U.S. Pat. No. 5,668,611 and U.S. Pat. No. 5,903,323 address the specific problem of having a large enough time window for the electronic components to load new image data bits into the spatial modulator.

Each of the above described inventions trade light source efficiency for improved gray levels or reduced electronic component speed requirements. However, efficient use of the light source is needed for high-quality projection displays in order to maximize brightness and color saturation of the projected image.

Recently, an electromechanical conformal grating device consisting of ribbon elements suspended above a substrate by a periodic sequence of intermediate supports was disclosed by Kowarz in U.S. Pat. No. 6,307,663, issued to Kowarz on Oct. 23, 2001, entitled "SPATIAL LIGHT MODULATOR WITH CONFORMAL GRATING DEVICE." The electromechanical conformal grating device is operated by electrostatic actuation, which causes the ribbon elements to conform around the support substructure, thereby producing a grating. The device of '663 has more recently become known as the conformal GEMS device, with GEMS standing for grating electromechanical system. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system and enables a simpler optical system design with smaller optical elements. Display systems based on a linear array of conformal GEMS devices were described by Kowarz et al. in U.S. Pat. No. 6,411,425, entitled "ELECTROMECHANICAL GRATING DISPLAY SYSTEM WITH SPATIALLY SEPARATED LIGHT BEAMS," issued Jun. 25, 2002 and by Kowarz et al. in U.S. Pat. No. 6,476,848, entitled "ELECTROMECHANICAL GRATING DISPLAY SYSTEM WITH SEGMENTED WAVEPLATE," issued Nov. 5, 2002.

Figure 1:
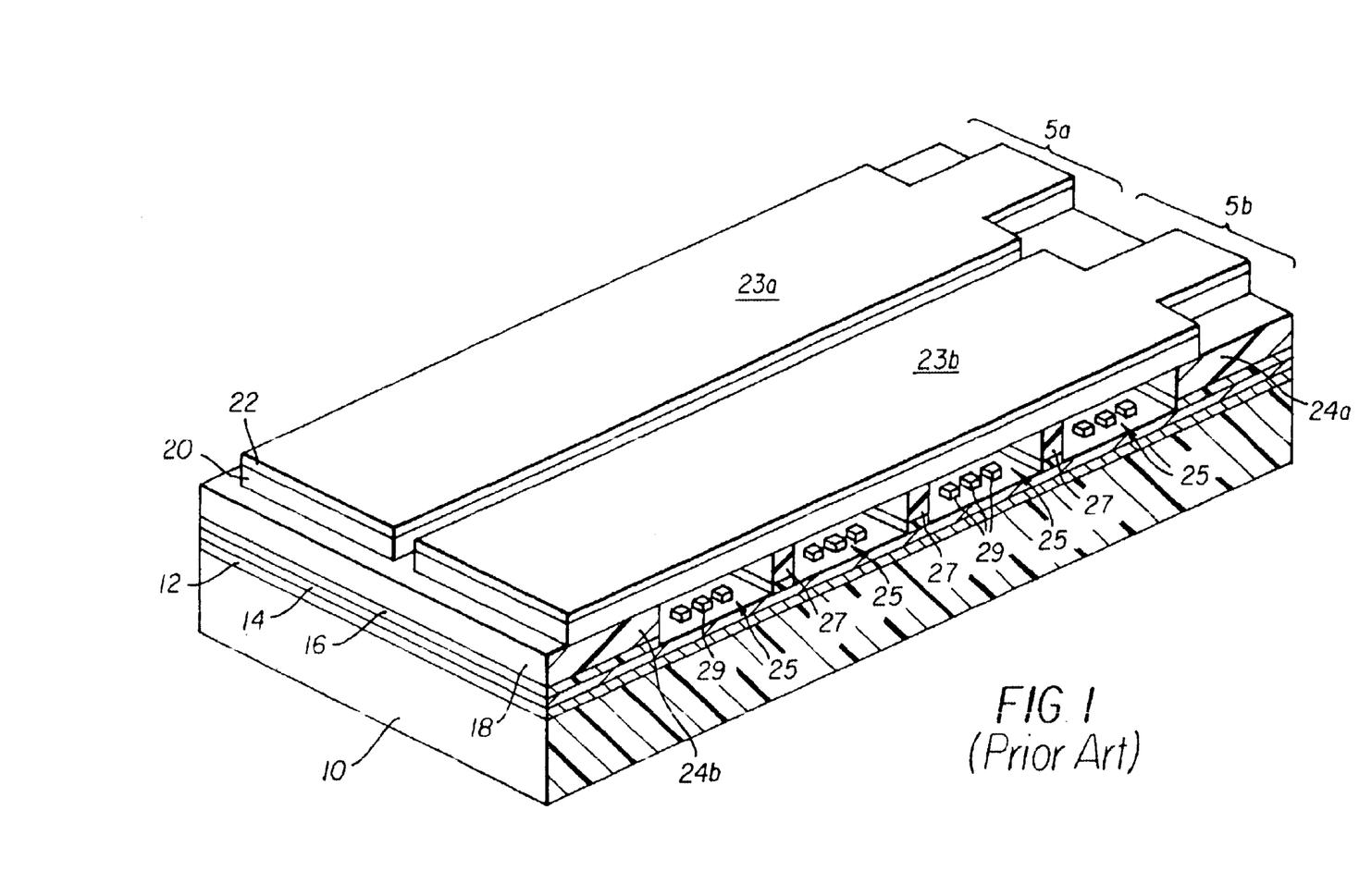
FIG. 1 is a prior art perspective view of two conformal GEMS devices in a linear array.
Figure 2:
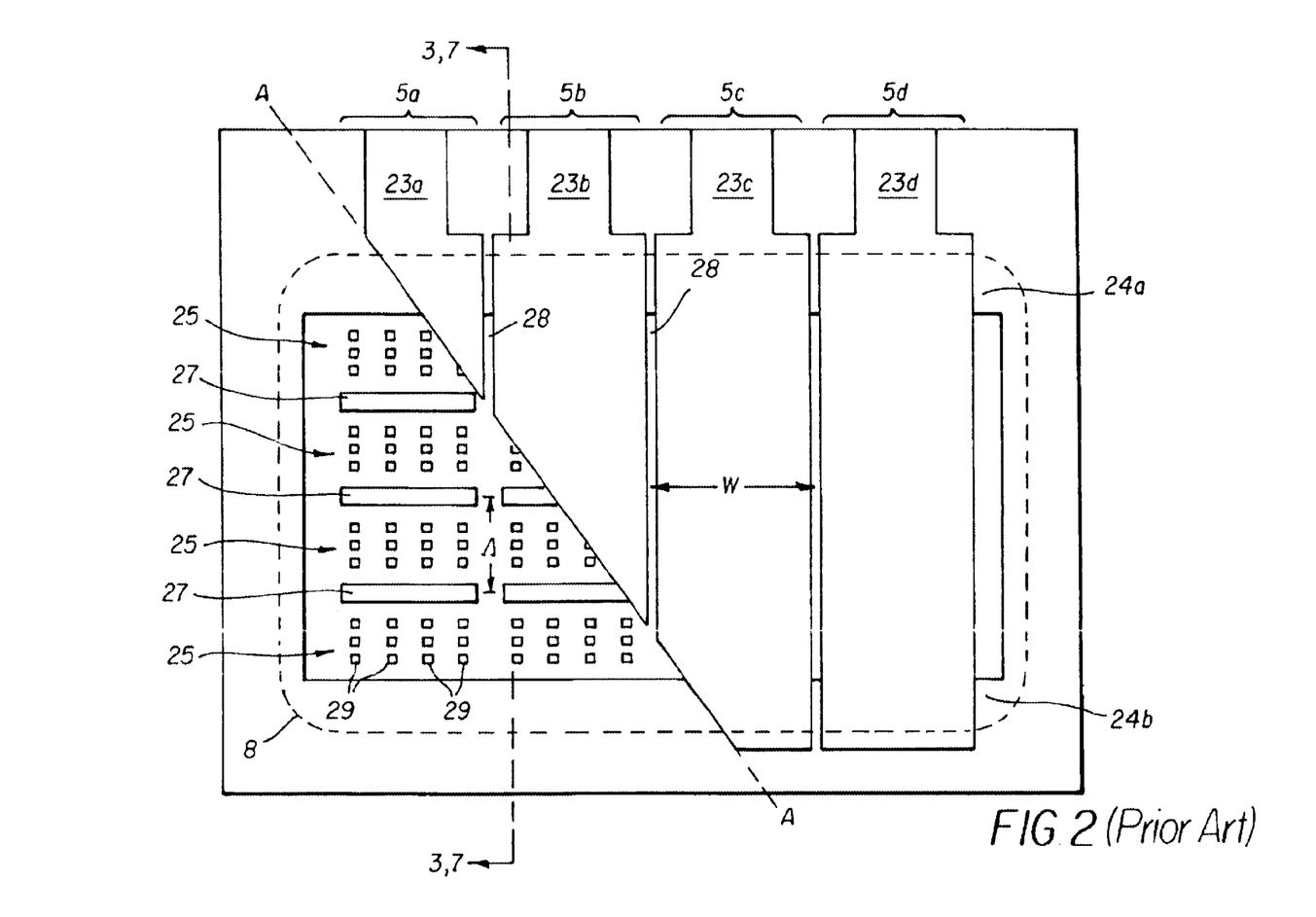
FIG. 2 is a prior art, partially cut-away top view of four conformal GEMS devices in a linear array.
Figure 3A:
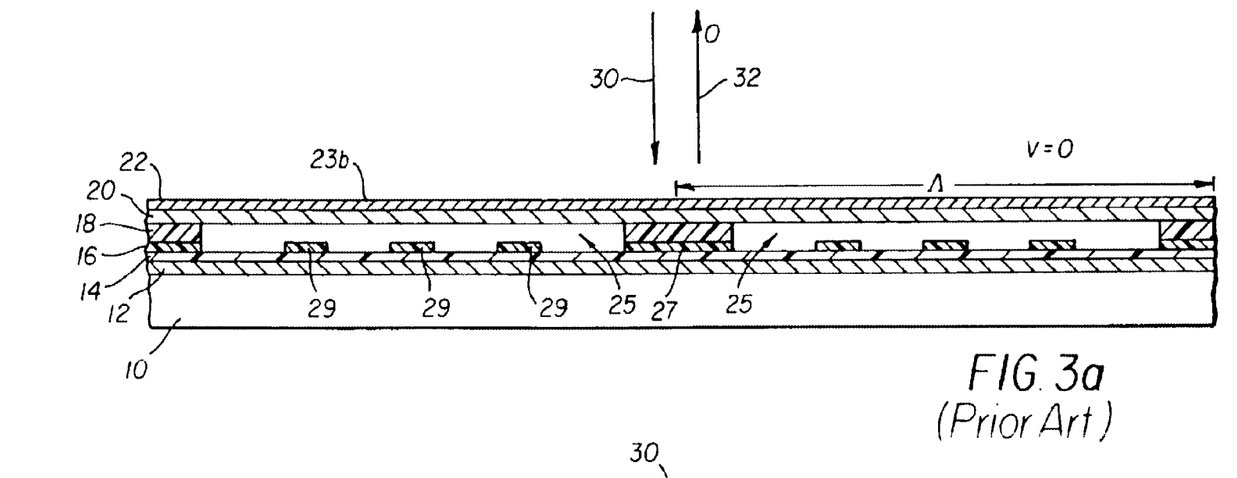
FIGS. 3a and 3b are prior art cross-sectional views through line 3,7-3,7 in FIG. 2, showing the operation of a conformal GEMS device in an unactuated state with V=0 and a fully actuated state with V=$V_{HIGH}$, respectively.
Figure 3B:
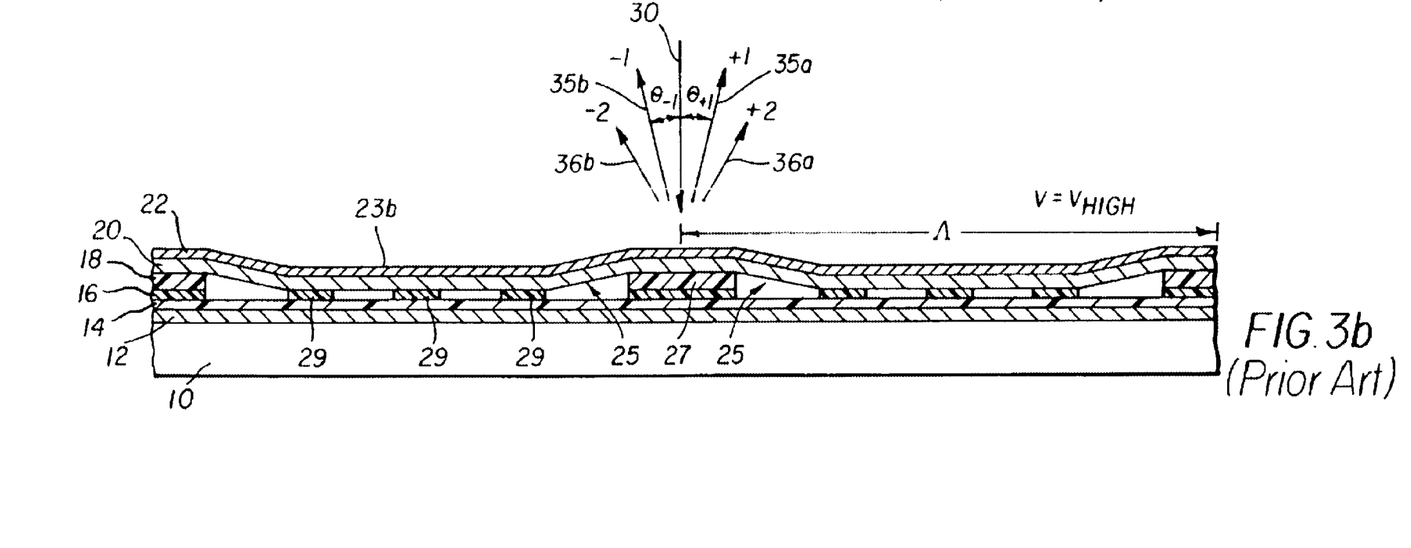

The conformal Grating Electromechanical System (GEMS) devices disclosed in U.S. Pat. No. 6,307,663 are illustrated in FIGS. 1–3. FIG. 1 shows two side-by-side conformal GEMS devices $5a$ and $5b$ in an unactuated state. The conformal GEMS devices $5a$ and $5b$ are formed on top of a substrate 10 covered by a bottom conductive layer 12, which acts as an electrode to actuate the devices $5a$, $5b$. The bottom conductive layer 12 is covered by a dielectric protective layer 14 followed by a standoff layer 16 and a spacer layer 18. On top of the spacer layer 18, a ribbon layer 20 is formed which is covered by a reflective layer and conductive layer 22. The reflective and conductive layer 22 provides electrodes for the actuation of the conformal GEMS devices $5a$ and $5b$. Accordingly, the reflective and conductive layer 22 is patterned to provide electrodes for the two conformal GEMS devices $5a$ and $5b$. The ribbon layer 20, preferably, comprises a material with a sufficient tensile stress to provide a large restoring force. Each of the two conformal GEMS devices $5a$ and $5b$ has an associated elongated ribbon element $23a$ and $23b$, respectively, patterned from the reflective and conductive layer 22 and the ribbon layer 20. The elongated ribbon elements $23a$ and $23b$ are supported by end supports $24a$ and $24b$, formed from the spacer layer 18, and by one or more intermediate supports 27 that are uniformly separated in order to form equal-width channels 25. The elongated ribbon elements $23a$ and $23b$ are secured to the end supports $24a$ and $24b$ and to the intermediate supports 27. A plurality of square standoffs 29 is patterned at the bottom of the channels 25 from the standoff layer 16. These standoffs 29 reduce the possibility of the elongated ribbon elements $23a$ and $23b$ sticking when actuated.

A top view of a four-device linear array of conformal GEMS devices $5a$, $5b$, $5c$ and $5d$ is shown in FIG. 2. The elongated ribbon elements 23a, 23b, 23c, and 23d are depicted partially removed over the portion of the diagram below the line A—A in order to show the underlying structure in an active region 8. For best optical performance and maximum contrast, the intermediate supports 27 should preferably be completely hidden below the elongated ribbon elements 23a, 23b, 23c, and 23d. Therefore, when viewed from the top, the intermediate supports 27 should not be visible in the gaps 28 between the conformal GEMS devices 5a–5d. Here, each of the conformal GEMS devices 5a–5d has three intermediate supports 27 with four equal-width channels 25. The center-to-center separation A of the intermediate supports 27 defines the period of the conformal GEMS devices in the actuated state. The elongated ribbon elements 23a–23d are mechanically and electrically isolated from one another, allowing independent operation of the four conformal GEMS devices 5a–5d. The bottom conductive layer 12 of FIG. 1 can be common to all of the conformal GEMS devices 5a–5d.

FIG. 3a is a side view, through line 3,7-3,7 of FIG. 2, of two channels 25 of the conformal GEMS device 5b (as shown and described in FIGS. 1 and 2) in an unactuated state. FIG. 3b shows the same view for an actuated state. For operation of the device, an attractive electrostatic force is produced by applying a voltage difference between the bottom conductive layer 12 and the reflective and conductive layer 22 of the elongated ribbon element 23b. In, the unactuated state (see FIG. 3a), with no voltage difference (V=0), the ribbon element 23b is suspended flat between the supports. In this state, an incident light beam 30 is primarily reflected into a 0th order light beam 32, as in a simple planar mirror. To obtain the actuated state, a voltage is applied to the conformal GEMS device 5b, which deforms the elongated ribbon element 23b and produces a partially conformal grating with period A. FIG. 3b shows the device 5b (as shown and described in FIGS. 1 and 2) in the fully actuated state with the applied voltage at V=$V_{HIGH}$ and the elongated ribbon element 23b in contact with standoffs 29. The height difference between the bottom of element 23b and the top of the standoffs 29 is chosen to be approximately ¼ of the wavelength λ of the incident light. The optimum height depends on the specific conformal shape of the actuated device. In the actuated state, the incident light beam 30 is primarily diffracted into the +1st order light beam 35a and −1st order light beam 35b, with additional light diffracted into the +2nd order 36a and −2nd order 36b. A small amount of light is diffracted into even higher orders and some light remains in the 0th order. In general, one or more of the various beams can be collected and used by an optical system, depending on the application. When the applied voltage is removed, the forces due to tensile stress and bending restores the ribbon element 23b to its original unactuated state, as shown in FIG. 3a.

Figure 4:
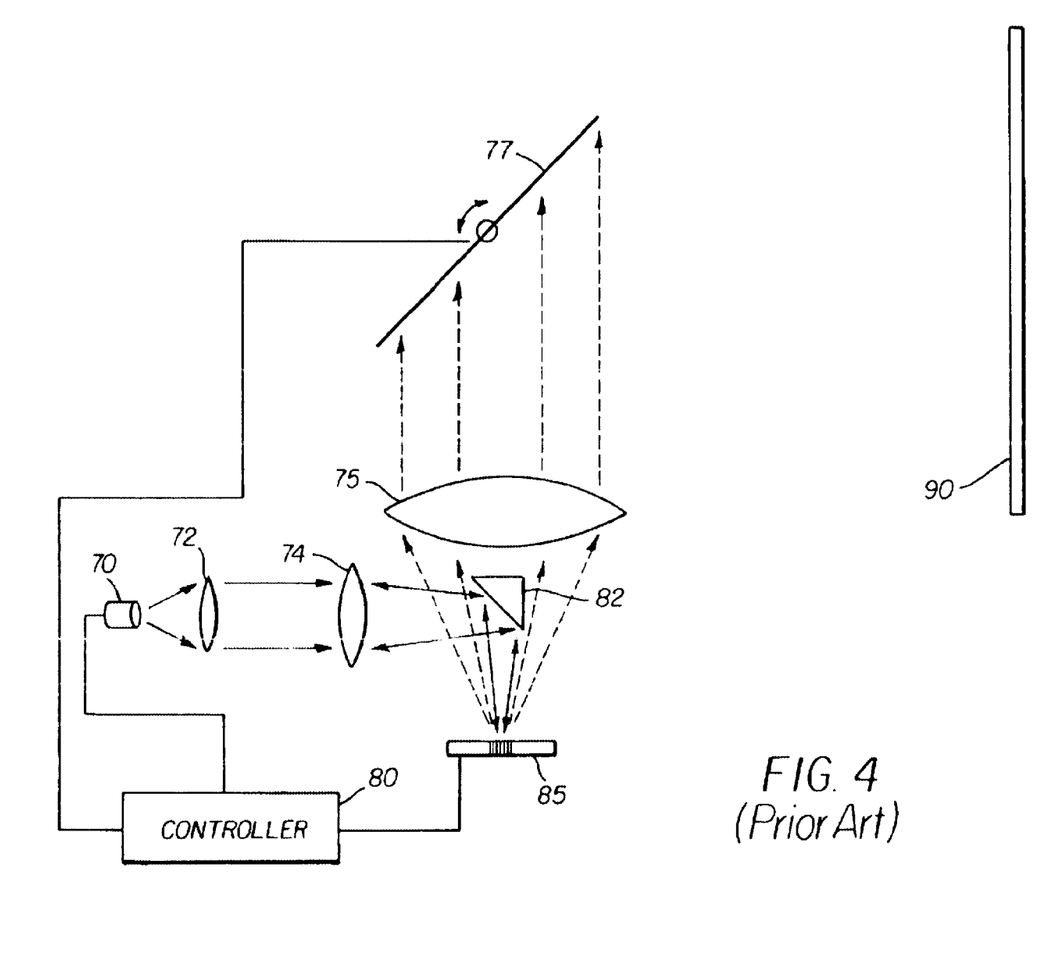
FIG. 4 is a prior art schematic illustrating a line-scanned display system incorporating a linear array of conformal GEMS devices.

FIG. 4 illustrates a display system containing a linear array 85 of conformal GEMS devices, as disclosed in U.S. Pat. No. 6,411,425. Light emitted from a source 70, preferably a laser, is conditioned by a pair of lenses 72 and 74, before hitting a turning mirror 82 and illuminating the linear array 85. The display system forms an entire two-dimensional scene from a scan of a one-dimensional line image of the linear array 85 across the screen 90. The conformal GEMS devices of the linear array 85 are capable of rapidly modulating incident light to produce multiple lines of pixels with gray levels. The controller 80 selectively activates the linear array 85 to obtain the desired pixel pattern for a given line of a two-dimensional scene. If a particular conformal GEMS device is not actuated, it reflects the incident light beam primarily into the 0th order light beam, which is directed back towards the source 70 by the turning mirror 82. If a particular conformal GEMS device is actuated, it diffracts the incident light beams primarily into $+2^{nd}$, $+1^{st}$, $-1^{st}$ and $-2^{nd}$ order light beams. These diffracted light beams pass around the turning mirror 82 and are projected on the screen 90 by the projection lens system 75. The scanning mirror 77 sweeps the line image across the screen 90 to form the two-dimensional image. Synchronization between the sweep of the scanning mirror 77 and the image data stream is provided by the controller 80.

Figure 5:
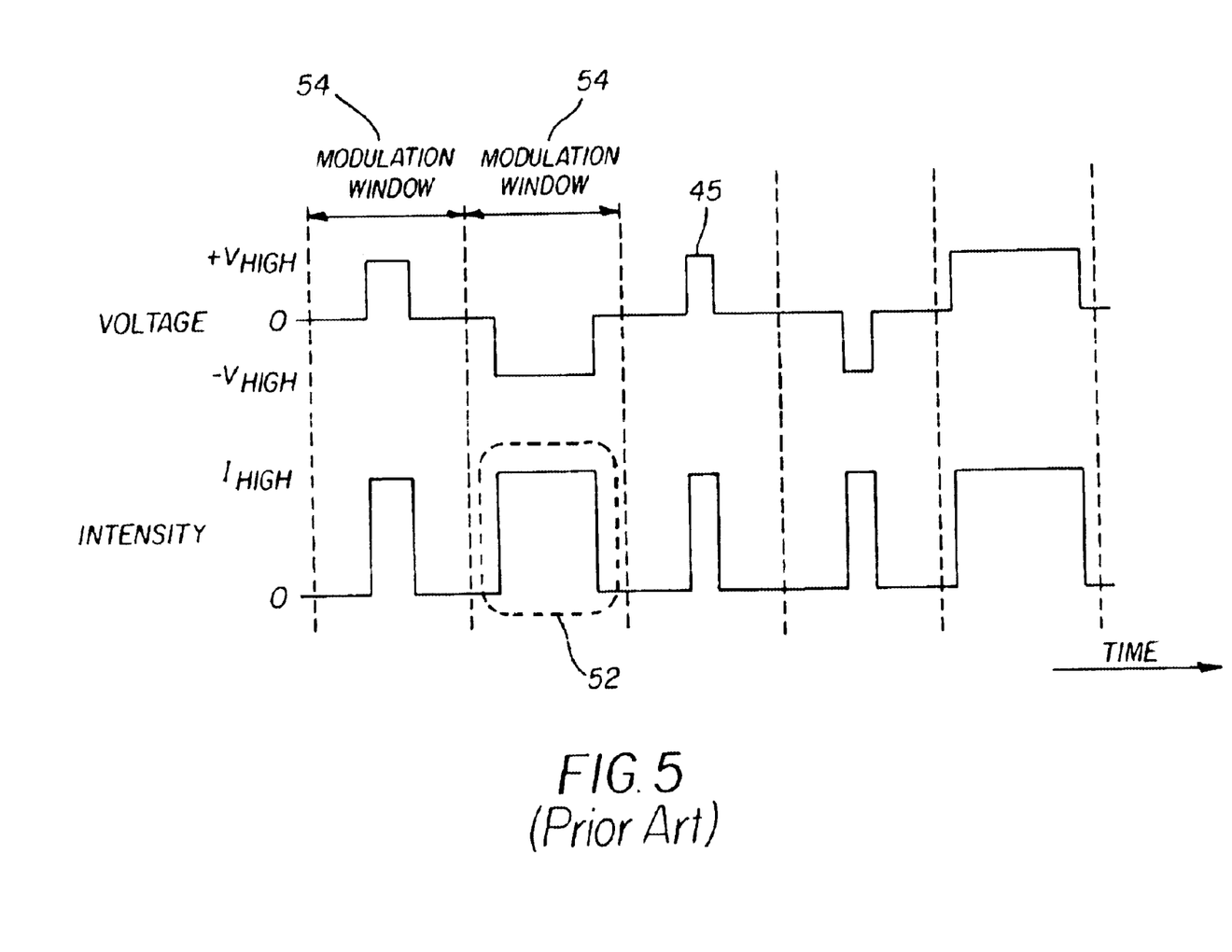
FIG. 5 illustrates prior art formation of gray levels through single-level pulse width modulation.

In order to form gray levels in an image, pulse-width-modulated (PWM) waveforms are applied to the conformal GEMS devices of the linear array 85, as described by Kowarz et al., "Conformal Grating Electromechanical System (GEMS) for High-Speed Digital Light Modulation," IEEE 15$^{th}$ International MEMS Conference Technical Digest, pgs. 568–573 (2002). FIG. 5 shows a conventional single-level PWM waveform 45 with voltage $V_{HIGH}$, together with the corresponding device's output (e.g., diffracted light intensity). To obtain a desired gray level, the controller 80 selects the voltage pulse width in each modulation window 54, according to a data stream. When the single-level PWM waveform 45 transitions from 0 V to $V_{HIGH}$, the device (for example, 5a and 5b shown in FIG. 1) actuates and begins diffracting light. When the waveform transitions back to 0 V, the device stops diffracting light. This process is applied to each conformal GEMS device of the linear array 85. In the display system of FIG. 4, the modulation window 54 corresponds to the time used to form a single line of the two-dimensional image. The gray level perceived in a pixel of the image is, therefore, the integrated light intensity 52 within the modulation window 54. To minimize charging effects within the device, the applied voltage can be periodically switched between $V_{HIGH}$ and $-V_{HIGH}$ (see U. S. Pat. No. 6,144,481). Since the force on the ribbon elements 23a–23d is independent of polarity, the diffracted light intensity is polarity independent.

Figure 6:
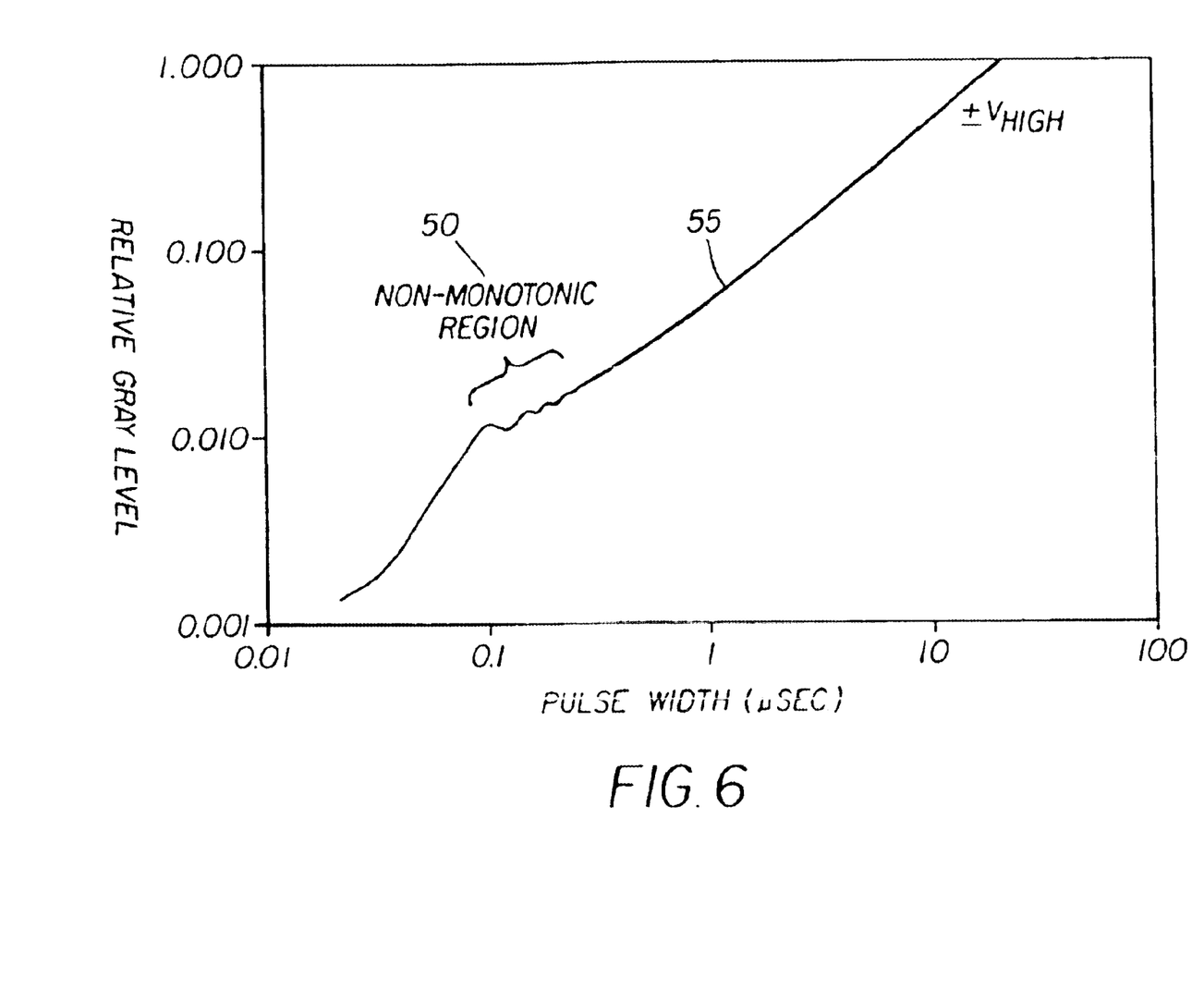
FIG. 6 is a plot showing a gray scale for a conformal GEMS device with gray levels obtained through single-level pulse width modulation.

FIG. 6 shows an example of a gray scale 55 generated using the conventional single-level PWM approach of FIG. 5. In this plot, relative gray levels are shown as a function of pulse width ($\pm V_{HIGH}$) for a modulation window 54 of 20 μsec. When the pulse width is between 0.3 μsec and 20 μsec, the relationship between gray level and pulse width is approximately linear. A non-monotonic (and nonlinear) region 50 is present, however, for pulse widths between approximately 0.3 μsec and 0.1 μsec. This non-monotonic behavior occurs because of the resonant dynamics of the conformal GEMS device The particular shape of the non-monotonic region 50 depends on a number of factors, including device geometry and driver slew rate. For pulse widths shorter than approximately 0.1 μsec, there is a monotonic, non-linear correspondence between pulse width and gray level. The dark (gray) levels in the non-monotonic region 50 can be difficult to use in practice because of the difficulty in determining the exact correspondence between a desired gray level and the pulse width required to generate that particular gray level.

The techniques described in the prior art for improving gray levels all lower the average optical power incident on the spatial light modulator for some period of time, thus generating multiple illumination levels corresponding to decreased intensity. Multiple illumination levels reduce the speed requirements of the spatial light modulator and its associated electronic components. However, a serious technical drawback to this approach is that it wastes optical power that is available from the light source during lower illumination intervals. Furthermore, for certain types of light sources, reducing the illumination level increases system complexity. The same drawbacks apply when these techniques are used in a display system based on electromechanical grating devices. There is a need, therefore, for a method of generating enhanced gray levels in an electromechanical grating display system that makes efficient use of available optical power and does not significantly increase system complexity.

SUMMARY OF THE INVENTION

The aforementioned need is met according to the present invention by providing a method for actuating an electromechanical grating device that has ribbon elements. The method includes the steps of: providing a data stream; generating a pulse width modulated waveform including at least two different non-zero voltages from the data stream; and applying the pulse width modulated waveform to the ribbon elements such that the ribbon elements transition through at least three different states of actuation that correspond to the pulse width modulated waveform.

Another aspect of the present invention provides a system for actuating an electromechanical grating device that has ribbon elements. The system includes: a data source that provides a data stream; means for generating a pulse width modulated waveform including at least two different non-zero voltages from the data stream; and means for applying the pulse width modulated waveform to the ribbon elements such that the ribbon elements transition through at least three different states of actuation corresponding to the pulse width modulated waveform.

A third aspect of the present invention provides an electromechanical grating device that includes a substrate and a set of elongated ribbon elements suspended above the substrate. Additionally, the electromechanical grating device includes means for generating a pulse width modulated waveform that has at least two different non-zero voltages from a data stream and means for applying the pulse width modulated waveform to the elongated ribbon elements such that the ribbon elements transition through at least three different states of actuation that correspond to the pulse width modulated waveform.

As described below, in addition to reducing the clock rate requirements, the present invention has the added benefit of allowing better generation of the dark levels corresponding to the non-monotonic region 50 of FIG. 6.

DETAILED DESCRIPTION OF THE INVENTION

Figure 7:
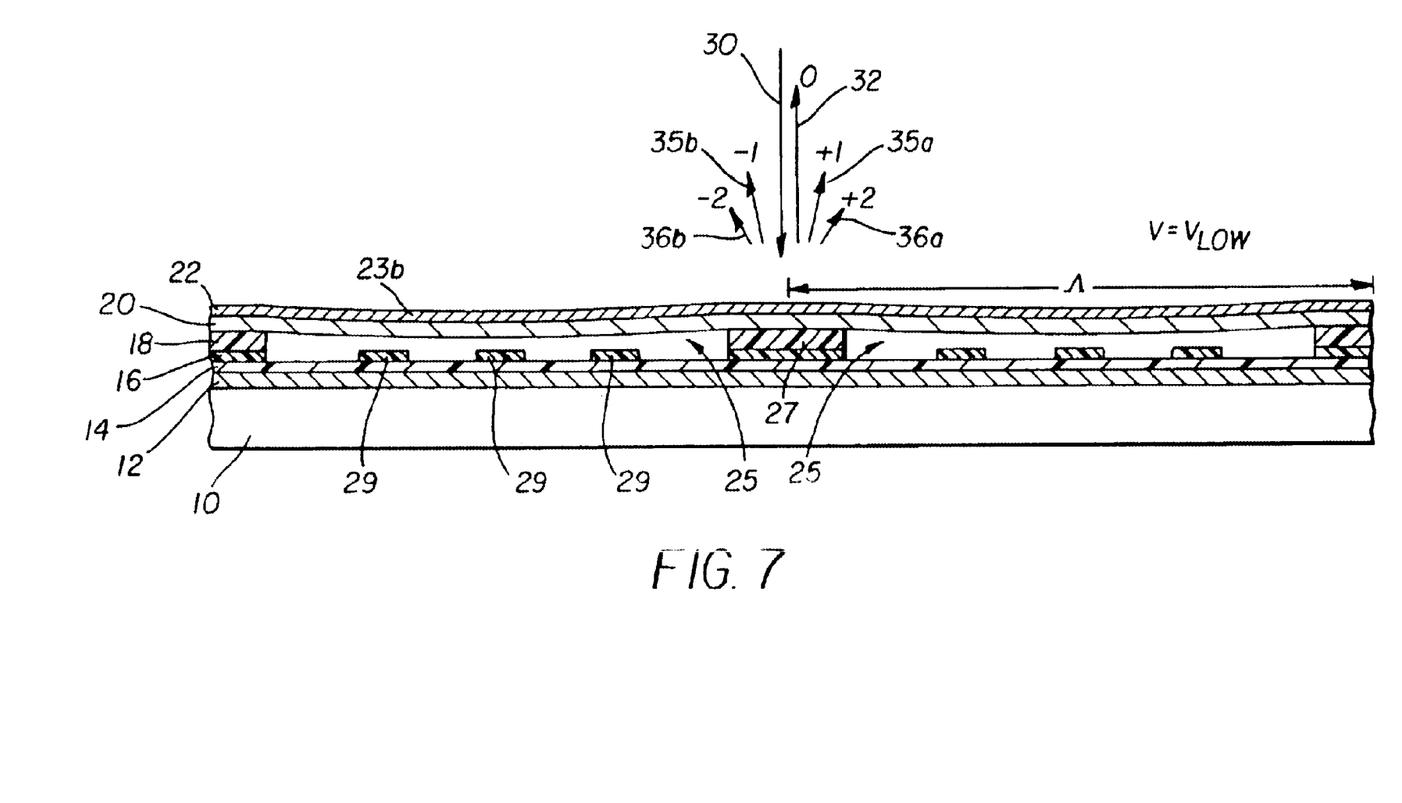
FIG. 7 is a cross-sectional views through line 3,5-3,5 in FIG. 2, showing the operation of a conformal GEMS device in a partially actuated state with V=$V_{LOW}$.

In the present invention, an additional voltage level $V_{LOW}$ is used to improve the generation of dark levels. Although best suited for conformal GEMS devices, the invention may also be applied to other electromechanical grating devices such as the Grating Light Valve (GLV) made by Silicon Light Machines. When $V_{LOW}$ is applied to a conformal GEMS device, a partially actuated state is generated, as illustrated in FIG. 7. The electrostatic force generated by $V_{LOW}$ produces a slight deformation in the elongated ribbon element 23b and generates a weak grating with period Λ. The elongated ribbon element 23b therefore stays suspended well above the underlying structure, i.e., above the standoffs 29. In this partially actuated state, the majority of the incident beam 30 is reflected into the 0th order light beam 32, with a small portion of the incident beam diffracted into the various non-zero diffracted orders (+1st order 35a, −1st order 35b, +2nd order 36a and −2nd order 36b). Typically, $V_{LOW}$ is selected to be a few volts less than the pull-down voltage $V_{PD}$, where the ribbon element 23b snaps into contact with the standoffs 29.

Figure 8:
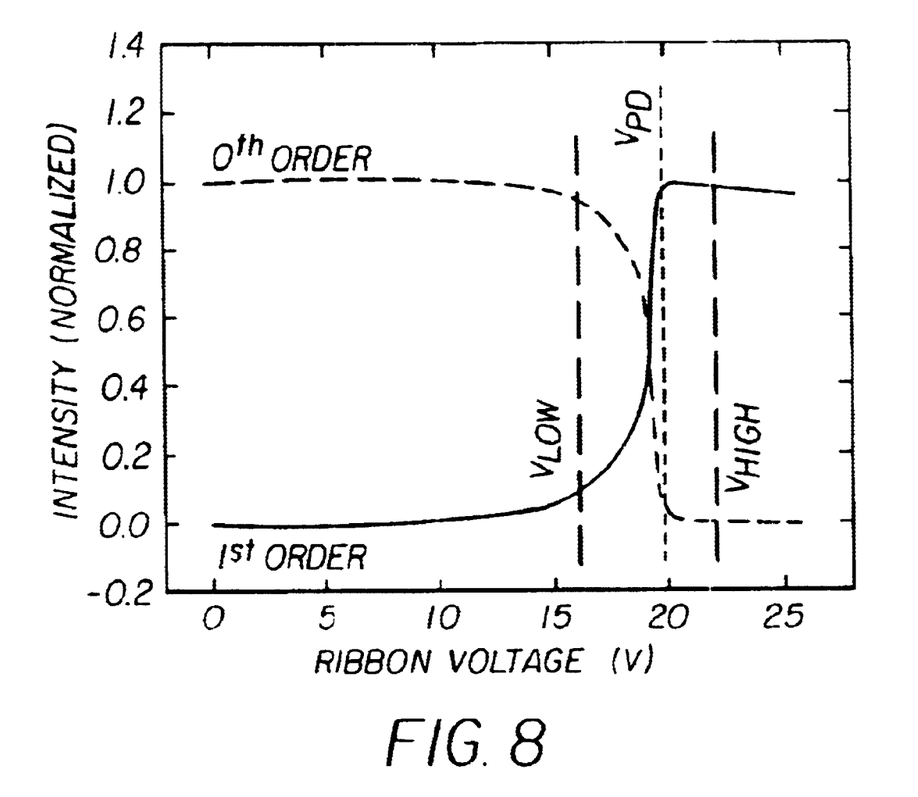
FIG. 8 is a plot of the $0^{th}$ order and $1^{st}$ order light intensity as a function of voltage, illustrating the selection of $V_{LOW}$ and $V_{HIGH}$.

FIG. 8, which is a plot of normalized intensity versus applied voltage for a digital input signal, illustrates the selection of $V_{LOW}$ and $V_{HIGH}$ for a particular conformal GEMS device. Here, $V_{HIGH}$~22V, $V_{PD}$~20V and $V_{LOW}$~16V. When the voltage is at $V_{HIGH}$, the reflected $0^{th}$ order is almost completely extinguished and most of the incident light is diffracted into the non-zero orders. On the other hand, at $V_{LOW}$, most of the incident light is reflected with only a small percentage present in the non-zero orders. This small percentage can be used to produce finer and more predictable dark levels.

Figure 9:
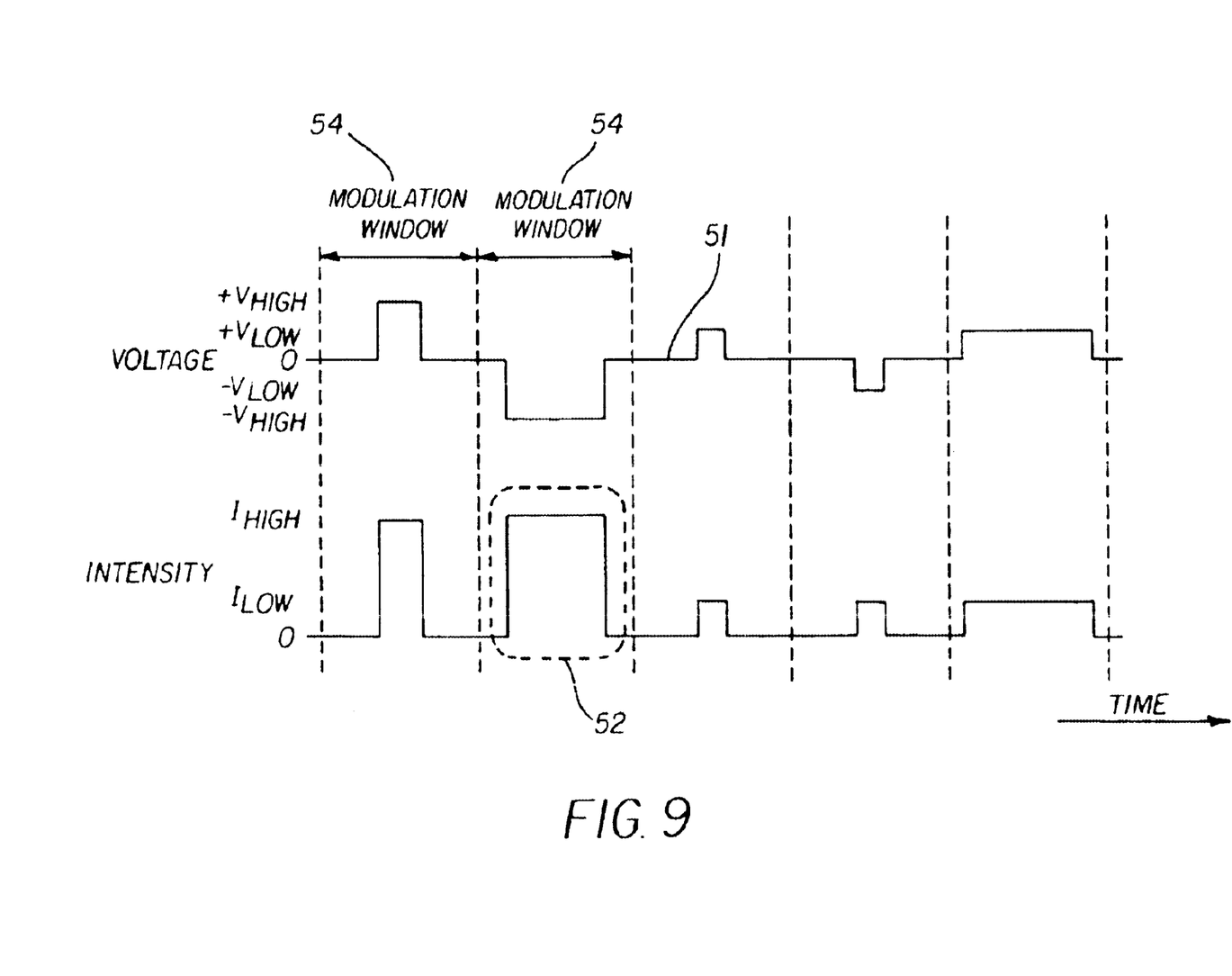
FIG. 9 illustrates the formation of gray levels through dual-level pulse width modulation.

FIG. 9 illustrates a dual-level PWM waveform 51 for the present invention also showing the corresponding diffracted light intensity. The two voltage amplitudes $V_{HIGH}$ and $V_{LOW}$ generate associated intensity levels $I_{HIGH}$ and $I_{LOW}$, respectively. To obtain a desired gray level within each modulation window 54, the controller 80 selects the voltage amplitude (either $V_{HIGH}$ or $V_{LOW}$), the voltage pulse width, and (optionally) the polarity. At transitions in the dual-level PWM waveform 51 from 0 V to ±$V_{HIGH}$, the elongated ribbon elements of a conformal GEMS device actuate into contact with the standoffs, thereby causing diffraction of most of the incident light into the non-zero orders. At transitions from 0 V to ±$V_{LOW}$, the device partially actuates and diffracts a small percentage of light into the non-zero orders. As before, gray levels are obtained from the integrated light intensity 52 within a modulation window 54. Since the stress on the ribbon element is less in the partially actuated state than in the fully actuated state, and since the majority of image content is relatively dark, the use of a dual-level PWM waveform has the added benefit of reducing device aging.

Figure 10:
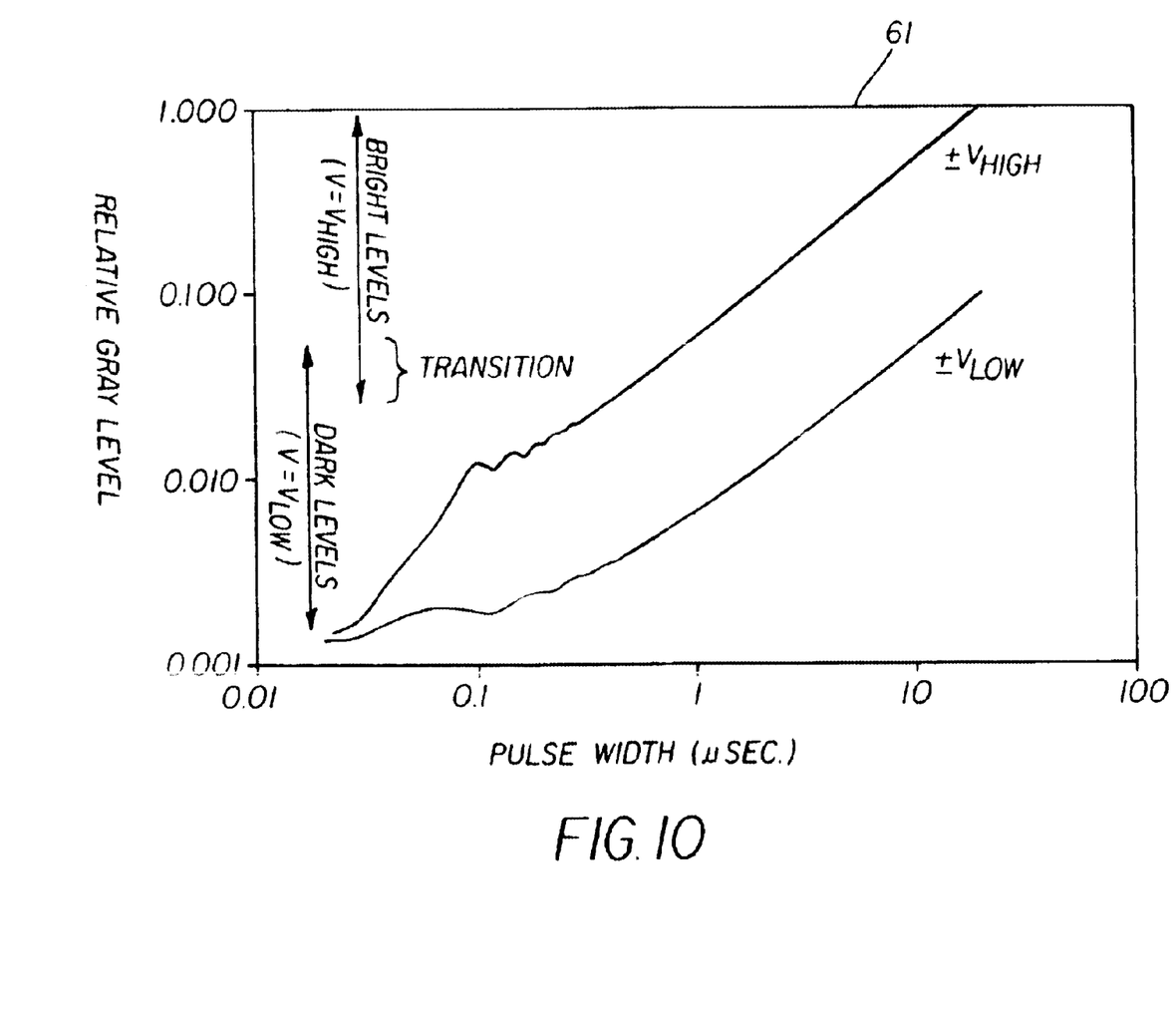
FIG. 10 is a plot showing the gray scale of a conformal GEMS device with gray levels obtained through dual-level pulse width modulated.

A gray scale 61 produced by the dual-level PWM waveform 51, of FIG. 9, is shown in FIG. 10. The two voltage amplitudes $V_{HIGH}$ and $V_{LOW}$ each have associated curves that relate gray level to pulse width. For bright levels in an image, the controller 80 selects the voltage amplitude selected to be $V_{HIGH}$, whereas for dark levels it is $V_{LOW}$. At a given pulse width, for pulses wider than approximately 0.1 μsec, the gray level corresponding to $V=V_{LOW}$ is approximately one tenth of the level for $V=V_{HIGH}$. The non-monotonic region 50 of FIG. 6 can be bypassed by using $V=V_{LOW}$ with the appropriate pulse width to generate the gray levels of interest. A transition region, where the gray levels can be formed with either $V_{HIGH}$ or $V_{LOW}$, can be used to provide headroom for calibration between the two gray level curves so as to produce a smooth continuous gray scale.

It is instructive to compare the clock rate of the dual-level PWM waveform 51 of the present invention with conventional (single-level) PWM waveform 45 for a high-quality projection display based on linear arrays of conformal GEMS devices. In this example, the system is chosen to have HDTV resolution with 1,920 scanned lines (1,080 by 1,920 pixels), a frame rate of 60 Hz and a gray scale capability of 13 linear bits per color per frame (8,192 gray levels). For the case of ordinary PWM, the pulse width increment must be somewhat less than 1/(1,920*60*8,192) seconds ~1nanoseconds to allow for some overhead for scanning. The digital electronics in the controller, therefore, need to generate an effective PWM clock of approximately 1 GHz. This effective clock frequency can be reduced substantially by implementing dual-level PWM, while maintaining the same system specifications. For example, by choosing $V_{HIGH}$ and $V_{LOW}$ so that the ratio of the intensity levels is $I_{LOW}/I_{HIGH}$~10, the effective PWM clock frequency can be reduced to approximately 100 MHz.

Figure 11:
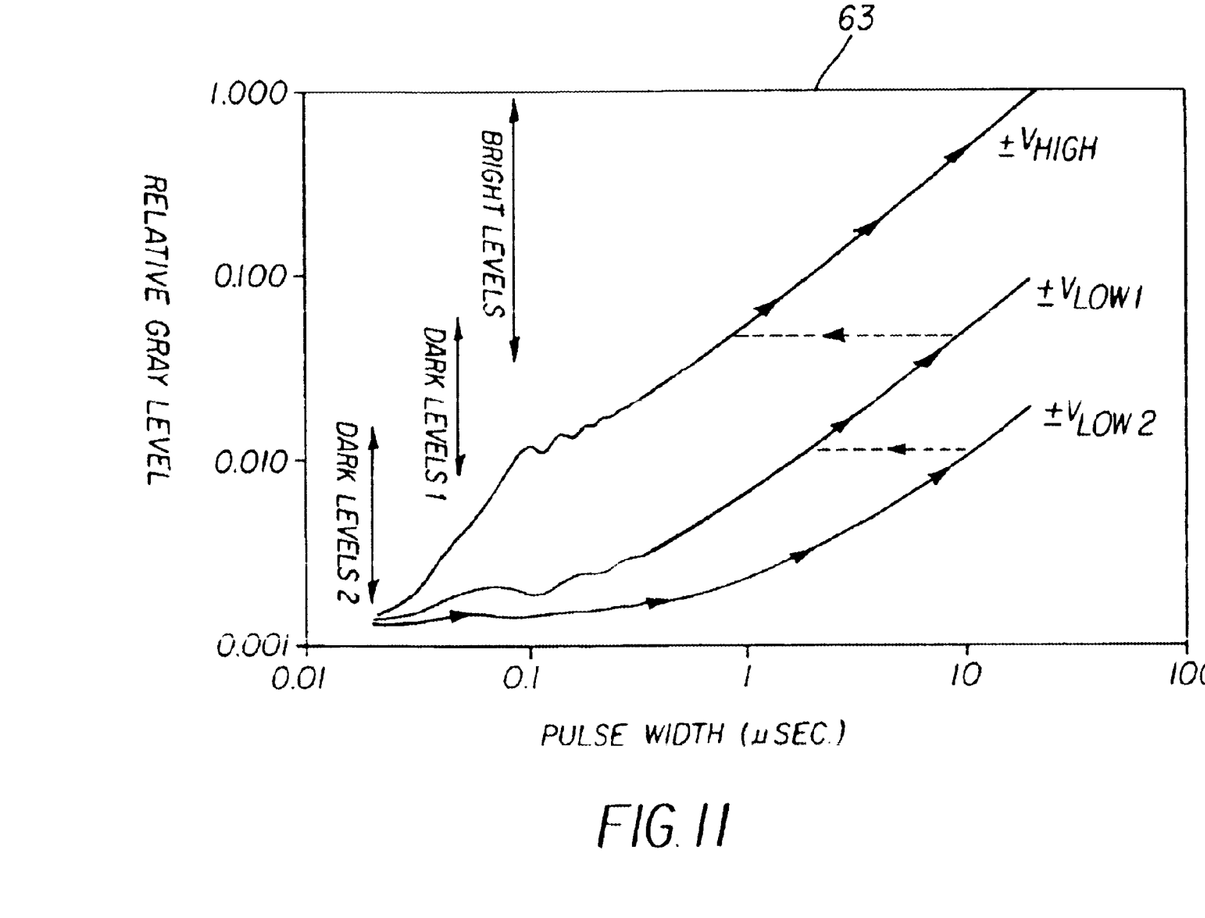
FIG. 11 is a plot showing the gray scale of a conformal GEMS device with gray levels obtained by multi-level pulse width modulation.

A multi-level PWM waveform (not shown) with more than two voltage amplitudes can be used to further improve the gray scale 63 of an image, as illustrated in FIG. 11 for the case of tri-level pulse width modulation. In this example, the application of $V_{HIGH}$ causes the elongated ribbon elements to fully actuate into contact with the standoffs, whereas $V_{LOW1}$ and $V_{LOW2}<V_{LOW1}$ produce two different states of partial ribbon actuation. The gray scale 63 then consists of bright levels formed using $V_{HIGH}$, dark levels (labeled dark levels 1 in FIG. 11) formed using $V_{LOW1}$ and very dark levels (labeled dark levels 2 in FIG. 11) formed using $V_{LOW2}$. Transition regions can again be used at the intersections between the usable ranges of the different gray level curves. The arrows in FIG. 11, which point towards increasing gray levels, illustrate one example of a continuous gray scale 63 formed from three segments on the three curves.

Figure 12:
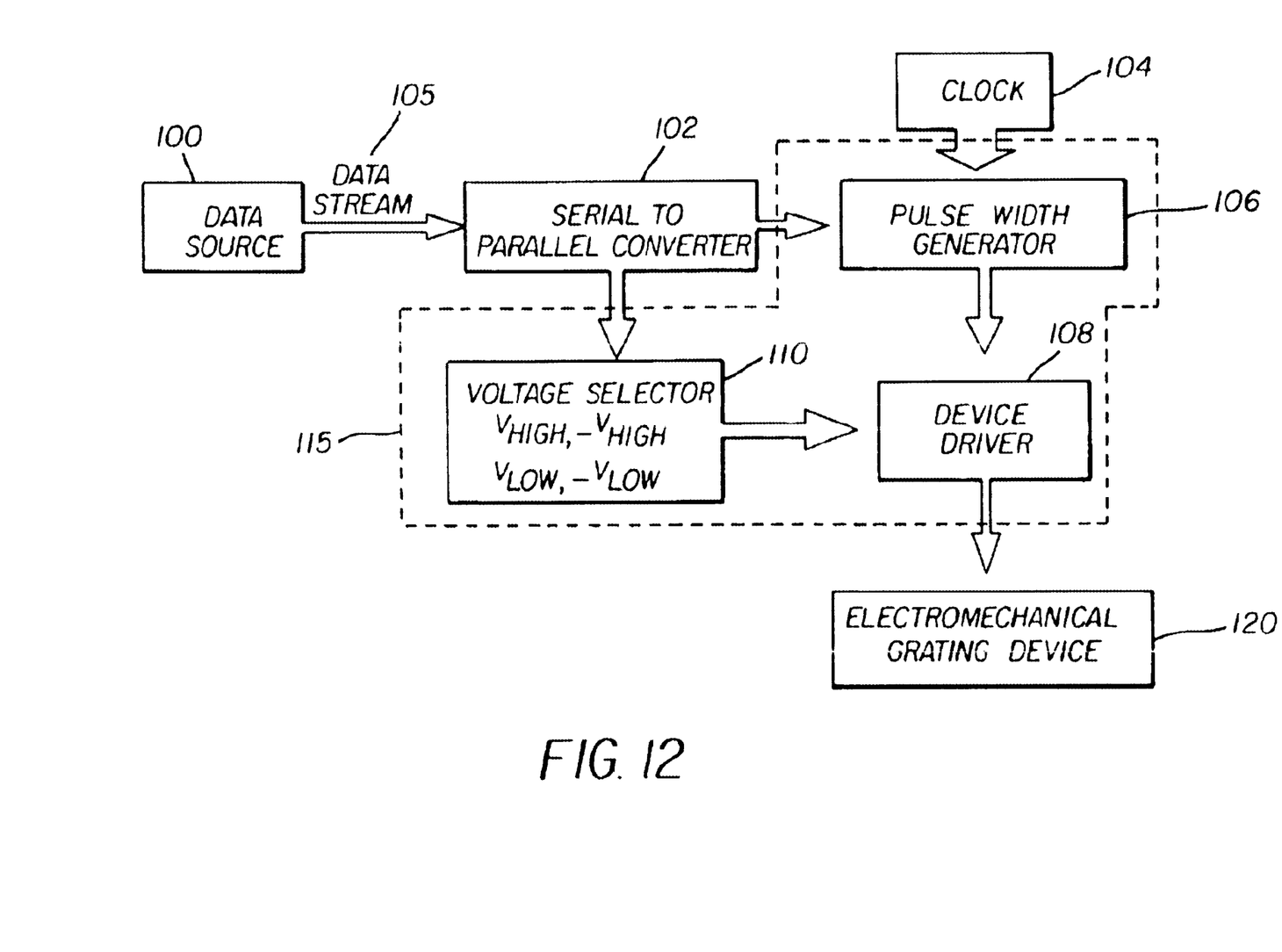
FIG. 12 shows a block diagram of the electronic architecture used to generate dual-level pulse width modulation.

FIG. 12 shows a block diagram of an electronic architecture for implementing dual-level PWM in an image-forming system, which could be a projection display or a printing system. A data source 100 provides a (serial) data stream 105 that has been appropriately preprocessed for generating an image from a linear array of electromechanical grating devices, preferably an array of conformal GEMS devices. Since each electromechanical grating device 120 of the linear array has its own device driver 108, a serial-to-parallel converter 102 is needed to demultiplex the data stream 105 into the appropriate parallel data channels 115. For example, in the HDTV system mentioned above, there would be 1080 parallel data channels 115 in order to address 1080 electromechanical grating devices 120, although only one of these parallel data channels 115 is shown in FIG. 12. The pulse-width-modulated output from each device driver 108 is determined by a pulse width generator 106 which controls the width of each voltage pulse via a clock 104, and a voltage selector 110 which selects the amplitude and polarity of each voltage pulse. The result is a dual-level PWM waveform similar to the waveform shown in FIG. 9.

In the embodiments described above, the selection of voltage amplitude is done independently for every pixel image. The voltage amplitude applied to each electromechanical grating device of the linear array can be therefore selected independently. This approach provides the most flexible and is most light efficient. If there is sufficient illumination available from the light source, the voltage amplitude may be varied in a periodic fashion. For example, the waveform could transition from $V_{HIGH}$ to $V_{LOW}$ to $-V_{HIGH}$ to $-V_{LOW}$ on a line-by-line basis or frame-by-frame basis. Although simpler to implement, this approach wastes nearly half of the incident light.

The invention has been described in detail with particular reference to certain preferred embodiments thereof, but it will be understood that variations and modifications can be effected within the spirit and scope of the invention.

PARTS LIST 5a conformal grating device
5b conformal grating device
5c conformal grating device
5d conformal grating device
8 active region
10 substrate
12 bottom conductive layer
14 protective layer
16 standoff layer
18 spacer layer
20 ribbon layer
22 reflective and conductive layer
23a elongated ribbon element
23b elongated ribbon element
23c elongated ribbon element
23d elongated ribbon element
24a end support
24b end support
25 channel
27 intermediate support
28 gap
29 standoff
30 light beam
32 $0^{th}$ order light beam
35a $+1^{st}$ order beam
35b $-1^{st}$ order beam
36a $+2^{nd}$ order beam
36b $-2^{nd}$ order beam
45 single-level PWM waveform
50 non-monotonic region
51 dual-level PWM waveform
52 integrated light intensity
54 modulation window
55 gray scale for single-level PWM
61 gray scale for dual-level PWM
63 gray scale for multi-level PWM
70 source
72 spherical lens
74 cylindrical lens
75 projection lens system
77 scanning mirror 80 controller
82 turning mirror
85 linear array
90 screen
100 data source
102 serial to parallel converter
104 clock
105 data stream
106 pulse width generator
108 device driver
110 voltage selector
115 parallel data channels
120 electromechanical grating device

What is claimed is:

1. A method for actuating an electromechanical grating device, including ribbon elements, comprising the steps of:
   a) providing a data stream;
   b) generating a pulse width modulated waveform including at least two different non-zero voltages from the data stream; and
   c) applying the pulse width modulated waveform to the ribbon elements such that the ribbon elements transition through at least three different states of actuation that correspond to the pulse width modulated waveform.

2. The method claimed in claim 1, wherein the at least three different states of actuation of the ribbon elements include an undeflected state, a partially deflected state, and a fully deflected state.

3. The method claimed in claim 1, wherein the at least two different non-zero voltages include $V_{HIGH}$, and $V_{LOW}$.

4. The method claimed in claim 3, wherein the ribbon elements make contact with an underlying structure when the pulse width modulated waveform is at $V_{HIGH}$.

5. The method claimed in claim 3, wherein the ribbon elements are suspended above an underlying structure when the pulse width modulated waveform is at $V_{LOW}$.

6. The method claimed in claim 1, wherein the at least two different non-zero voltages include $V_{HIGH}$, $V_{LOW}$, $-V_{HIGH}$, and $-V_{LOW}$.

7. The method claimed in claim 1, wherein the electromechanical grating device is a conformal GEMS device.

8. A method for generating enhanced image gray levels in an image-forming system with an electromechanical grating device, comprising the steps of:
   a) providing a data stream;
   b) generating a pulse width modulated waveform including at least two different non-zero voltages from the data stream; and
   c) applying the pulse width modulated waveform to ribbon elements of the electromechanical grating device such that the ribbon elements transition through at least three different states of actuation corresponding to the pulse width modulated waveform such that gray levels for an image are produced.

9. The method claimed in claim 8, wherein the at least three different states of actuation of the ribbon elements include an undeflected state, a partially deflected state, and a fully deflected state.

10. The method claimed in claim 8, wherein the at least two different non-zero voltages include $V_{HIGH}$, and $V_{LOW}$.

11. The method claimed in claim 10, wherein the ribbon elements make contact with an underlying structure when the pulse width modulated waveform is at $V_{HIGH}$.

12. The method claimed in claim 10, wherein the ribbon elements are suspended above an underlying structure when the pulse width modulated waveform is at $V_{LOW}$.

13. The method claimed in claim 10, wherein bright levels of the image are formed when the pulse width modulated waveform is at $V_{HIGH}$, and wherein dark levels of the image are formed when the pulse width modulated waveform is at $V_{LOW}$.

14. The method claimed in claim 13, wherein a transition region with overlap exists between the bright levels of the image and the dark levels of the image.

15. The method claimed in claim 8, wherein the at least two different non-zero voltages include $V_{HIGH}$, $V_{LOW}$, $-V_{HIGH}$, and $-V_{LOW}$.

16. The method claimed in claim 8, wherein the electromechanical grating device is a conformal GEMS device.

17. A method for generating enhanced gray levels in a display system including a linear array of electromechanical grating devices, comprising the steps of:
   a) providing a data stream;
   b) generating a pulse width modulated waveform, including at least two different non-zero voltages from the data stream, for each electromechanical grating device in the linear array; and
   c) applying the pulse width modulated waveform to the electromechanical grating devices, wherein bright levels in an image are formed at one of the at least two different non-zero voltages and dark levels are formed at another of the at least two different non-zero voltages.

18. The method claimed in claim 17, further comprising the step of:
   d) forming bright levels and dark levels simultaneously by selecting one of the at least two different non-zero voltages for each electromechanical grating device of the linear array in accordance with the data stream.

19. The method claimed in claim 17, further comprising the step of:
   d) forming bright levels and dark levels sequentially by alternating the at least two different non-zero voltages between a $V_{HIGH}$ and a $V_{LOW}$.

20. The method claimed in claim 19, wherein forming bright levels and dark levels sequentially includes alternating the $V_{HIGH}$ and the $V_{LOW}$ on a line by line basis.

21. The method claimed in claim 19, wherein forming bright levels and dark levels sequentially includes alternating the $V_{HIGH}$ and the $V_{LOW}$ on a frame by frame basis.

22. The method claimed in claim 17, wherein the dark levels include a first and a second dark level with different intensity levels.

23. The method claimed in claim 17, wherein the electromechanical grating devices are conformal GEMS devices.

24. A system for actuating an electromechanical grating device, containing ribbon elements comprising:
   a) a data source that provides a data stream;
   b) means for generating a pulse width modulated waveform including at least two different non-zero voltages from the data stream; and
   c) means for applying the pulse width modulated waveform to the ribbon elements such that the ribbon elements transition through at least three different states of actuation corresponding to the pulse width modulated waveform.

25. The system claimed in claim 24, wherein the at least three different states of actuation of the ribbon elements include an undeflected state, a partially deflected state, and a fully deflected state.

26. The system claimed in claim 24, wherein the at least two different non-zero voltages include $V_{HIGH}$, and $V_{LOW}$.

27. The system claimed in claim 26, wherein the ribbon elements make contact with an underlying structure when the pulse width modulated waveform is at $V_{HIGH}$.

28. The system claimed in claim 26, wherein the ribbon elements are suspended above an underlying structure when the pulse width modulated waveform is at $V_{LOW}$.

29. The system claimed in claim 24, wherein the at least two different non-zero voltages include $V_{HIGH}$, $V_{LOW}$, $-V_{HIGH}$, and $-V_{LOW}$.

30. The system claimed in claim 24, wherein the electromechanical grating device is a conformal GEMS device.

31. An image-forming system with enhanced gray levels, comprising:
  a) a data source that provides a data stream;
  b) a serial-to-parallel converter for receiving the data stream and transmitting the data stream onto a pulse width generator, wherein the pulse width generator generates a pulse width modulated waveform;
  c) a clock for controlling the pulse width generator according to the data stream within a modulation window;
  d) an electromechanical grating device for diffracting an incident light beam into a plurality of diffracted light beams, and;
  e) a voltage selector for selecting between at least two different non-zero voltages for application to the electromechanical grating device, wherein bright levels in an image are formed at one of the at least two different non-zero voltages and dark levels are formed at another of the at least two different nonzero voltages.

32. The image-forming system claimed in claim 31, wherein the plurality of diffracted light beams are selected from the group comprising: $0^{th}$ order, $+1^{st}$ order, $-1^{st}$ order, $+2^{nd}$ order and $-2^{nd}$ order.

33. The image-forming system claimed in claim 31, wherein the at least two different non-zero voltages include $V_{HIGH}$, and $V_{LOW}$.

34. The image-forming system claimed in claim 33, wherein the electromechanical grating device comprises suspended ribbon elements.

35. The image-forming system claimed in claim 34, wherein the ribbon elements undergo at least three different states of actuation, including an undeflected state, a partially deflected state, and a fully deflected state.

36. The image-forming system claimed in claim 34, wherein the suspended ribbon elements make contact with an underlying structure when the pulse width modulated waveform is at $V_{HIGH}$.

37. The image-forming system claimed in claim 34, wherein the suspended ribbon elements are spatially separated from an underlying structure when the pulse width modulated waveform is at $V_{LOW}$.

38. The image-forming system claimed in claim 31, wherein the at least two different non-zero voltages include $V_{HIGH}$, $V_{LOW}$, $-V_{HIGH}$, and $-V_{LOW}$.

39. The image-forming system claimed in claim 31 is a projection display system.

40. The image-forming system claimed in claim 31 is a printing system.

41. The image-forming system claimed in claim 31, wherein the electromechanical grating device is illuminated by a laser.

42. The image-forming system claimed in claim 31, wherein the electromechanical grating device is a conformal GEMS device.

43. An electromechanical grating device, comprising:
  a) a substrate;
  b) a set of elongated ribbon elements suspended above the substrate;
  c) means for generating a pulse width modulated waveform, including at least two different non-zero voltages from a data stream; and
  c) means for applying the pulse width modulated waveform to the elongated ribbon elements such that the elongated ribbon elements transition through at least three different states of actuation that correspond to the pulse width modulated waveform.

44. The electromechanical grating device claimed in claim 43, wherein the at least three different states of actuation of the elongated ribbon elements include an undeflected state, a partially deflected state, and a fully deflected state.

45. The electromechanical grating device claimed in claim 43, wherein the at least two different non-zero voltages include $V_{HIGH}$, and $V_{LOW}$.

46. The electromechanical grating device claimed in claim 45, wherein the elongated ribbon elements make contact with an underlying structure when the pulse width modulated waveform is at $V_{HIGH}$.

47. The electromechanical grating device claimed in claim 45, wherein the elongated ribbon elements are suspended above an underlying structure when the pulse width modulated waveform is at $V_{LOW}$.

48. The electromechanical grating device claimed in claim 43, wherein the at least two different non-zero voltages include $V_{HIGH}$, $V_{LOW}$, $-V_{HIGH}$, and $-V_{LOW}$.

* * * * *